United States Patent
Chatt et al.

(10) Patent No.: US 7,546,384 B1
(45) Date of Patent: Jun. 9, 2009

(54) MAINTAINING RELATIVE TIME STAMPS WHEN TRANSFERRING FILES ACROSS NETWORK

(75) Inventors: Alan Chatt, Wiltshire (GB); Dale Lane, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/144,110

(22) Filed: Jun. 23, 2008

(51) Int. Cl.
*G06F 15/16* (2006.01)
*G06F 12/00* (2006.01)

(52) U.S. Cl. .................. 709/248; 709/250
(58) Field of Classification Search ............. 709/248, 709/250, 227, 228, 232, 233, 223
See application file for complete search history.

(56) References Cited

U.S. PATENT DOCUMENTS

| | | | |
|---|---|---|---|
| 5,845,293 A | 12/1998 | Veghte et al. | |
| 7,200,158 B2* | 4/2007 | Gustin | 370/509 |
| 7,409,557 B2 | 8/2008 | Teppler | |
| 2002/0141452 A1* | 10/2002 | Mauritz et al. | 370/503 |
| 2004/0261091 A1 | 12/2004 | Cherkasova et al. | |
| 2005/0108626 A1* | 5/2005 | Ong | 715/511 |
| 2005/0117583 A1* | 6/2005 | Uchida et al. | 370/395.4 |
| 2005/0243625 A1* | 11/2005 | Miyazawa et al. | 365/222 |
| 2005/0286564 A1 | 12/2005 | Hatley et al. | |
| 2006/0004862 A1 | 1/2006 | Fisher et al. | |
| 2006/0156375 A1 | 7/2006 | Konetski | |
| 2008/0270799 A1 | 10/2008 | Yamaguchi et al. | |

OTHER PUBLICATIONS

Laplink for PC Upgraded, Network Version Mar. 2, 1993, Newsbytes, Mar. 2, 1993.

* cited by examiner

*Primary Examiner*—Zarni Maung
(74) *Attorney, Agent, or Firm*—King & Spalding LLP

(57) ABSTRACT

A method and system for maintaining relative timestamps when transferring files across a network. The method and system may include modifying timestamp attributes to account for differences in time between the location that transmitted a file and the location that received it.

1 Claim, 5 Drawing Sheets

MAINTAINING RELATIVE TIME STAMPS WHEN TRANSFERRING FILES ACROSS NETWORK

BACKGROUND OF THE INVENTION

Field of the Invention

This invention relates to timestamps and more particularly to maintaining timestamps during file transfers.

Background

A time stamp (or timestamp) is a sequence of characters that denotes the date and/or time at which a certain event occurred. This data is usually presented in a consistent format, allowing for easy comparison of two different records and tracking progress over time. The practice of recording timestamps in a consistent manner along with the actual data is called timestamping. Timestamps are typically used for logging events, in which case each event in a log is marked with a timestamp. In file systems, a timestamp associated with a file may represent the stored date/time of creation or modification of the file.

When transferring electronic files between servers using technologies such as the file transport protocol ("ftp") or network-mounted file systems, the timestamps associated with the transferred files are typically lost. (It is noted that "server" as used herein is to be interpreted broadly to encompass any computer system or electronic storage location.) For example, when transmitting via ftp a file that was last modified at 12:30 P.M. on Jan. 1, 2008 from server "A" to server "Z," the file created on server Z will have a "date modified" timestamp with the date and time the file was transferred onto server Z and not the actual date and time of the last modification (which was 12:30 P.M. on Jan. 1, 2008). Likewise, the file will have a "date created" timestamp representing the date and time the file was transferred onto server Z and not the actual creation date and time of the file (which likely preceded 12:30 P.M. on Jan. 1, 2008). As a result, potentially useful information associated with a particular file will be lost when it is transferred. By simply being copied to a new server location, even though the contents of a file are generally not altered, the creation and modification information in the associated timestamps is overwritten with the time and date of the file transfer.

Consider a scenario where a group of files are transferred at the same time. In their original location, the files had associated timestamps with creation and modification information. Those timestamps would have different dates and times if the files weren't created or modified at the same time. Information about when the files were created or modified (such as which file was created/modified first or which file was created/modified last) could be very valuable to the user or the server. However, if all of the files were to be transferred to a different storage location (i.e., server) at the same time, the timestamp information associated with those files would generally be rewritten to denote the date and time of the file transfer and all the files would then have a nearly identical date and time. The user would thereafter be unable to determine the actual creation and modification dates of those files or distinguish between them based on timestamp information.

There are some prior art approaches that provide partial solutions. For example, the secure ftp ("SFTP") protocol allows for the transfer of files while maintaining their timestamp attributes. Extensions to ftp can also be used to similar effect (see for example, The "MFMT", "MFCT", and "MFF" Command Extensions for FTP by David Somers, http://tools.ietf.org/html/draft-somers-ftp-mfxx-03).

Despite their added benefits however, these prior art solutions cannot always provide accurate timestamp information pursuant to a file transfer. Consider a scenario where files are collected and copied from multiple servers A, B and C to a receiving server Z. The current date and time according to the three transmitting servers (A, B and C) may not be synchronized (i.e., "out of sync"), such that when it is 12:30 P.M. on server A it is 12:35 P.M. on server B. Therefore, even if the servers implement a transfer protocol that maintains the original timestamp attributes (such as implemented in the prior art described above), the timestamps of files transferred to server Z from one server (e.g., A) cannot be accurately compared against files from a different originating server (e.g., B or C). This is because even if two files' timestamps both say they were modified at 12:35 P.M. on the same date, the files may have actually been modified a few minutes apart and only have the same modification timestamp because their servers are out of sync with each other.

In another likely scenario, multiple instances of an important data file (for example, a computer log that tracks some type of activity) may be generated on different servers. At some point, there may be a need for the most recent version of the file, regardless of its originating server. If the two servers are out of sync, an older version of the file may be recovered instead of the more recent version because the older version of the file resides on a server with a date and time set a few minutes ahead of the server containing the more recent version of the file. If the file is modified on a regular basis (every few seconds or minutes), a difference of a few minutes can be significant because a substantial amount of information may not be conveyed to the receiving server (which is led to believe it has the most recently modified version of the data file, but in fact, does not).

In addition, certain "build systems" which collect files from multiple servers for a single application or service need to be able to make sensible timestamp comparisons.

Consider also a scenario where the transmitting servers reside in different time zones. A file originating from a server in Europe can have a "date modified" timestamp identical to a file originating from a server in the United States, even though the files were actually modified many hours apart. If both files were transferred to a receiving server, even if the timestamps were preserved, their timestamps would provide an inaccurate reflection of when the files were modified or created.

It is therefore evident that the prior art solutions for maintaining timestamps during file transfers may fail in many instances to provide accurate timestamp information.

SUMMARY OF THE INVENTION

The shortcomings of the prior art are overcome and additional advantages are provided with a method and system for maintaining relative file timestamps. The difference between the current date and time according to a transmitting location and the current date and time according to a receiving location is determined. Files can then be transmitted from the transmitting location to the receiving location, along with timestamp attributes associated with each transmitted file. The timestamp attributes of each transmitted file can then be modified to account for the difference in date and time between the transmitting location and the receiving location (if any) so that the timestamp attributes are accurate relative to the current date and time according to the receiving location.

Additional features and advantages are realized through the techniques of the present invention. Other embodiments and aspects of the invention may be recognized from the description and the drawings.

BRIEF DESCRIPTION OF THE DRAWINGS

The subject matter which is regarded as the invention is particularly pointed out and distinctly claimed in the claim(s) at the conclusion of the specification. The foregoing and other objects, features, and advantages of the invention are apparent from the following detailed description taken in conjunction with the accompanying drawings in which:

The detailed description explains the preferred embodiments of the invention, together with the advantages and features, by way of example with reference to the drawings, which are not necessarily drawn to scale.

DETAILED DESCRIPTION OF THE INVENTION

Figure 1:
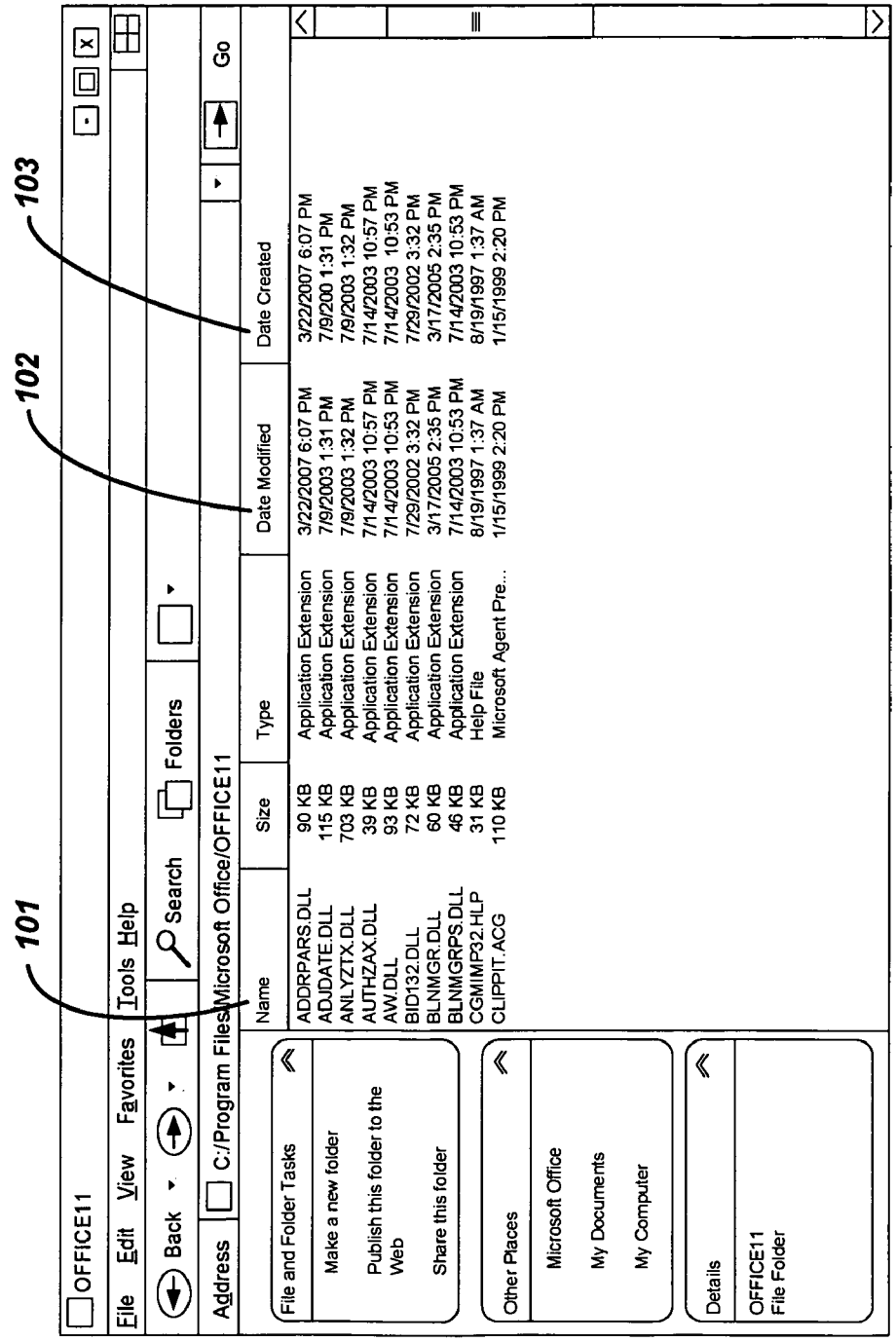
FIG. 1 illustrates a list of files with their associated timestamps, as is commonly found in the prior art.

FIG. 1 illustrates, for sake of clarity, a typical list of files 101 located on a server (i.e., computer) with an associated "Date Modified" timestamp 102 and an associated "Date Created" timestamp 103. It is recognized that FIG. 1 represents an illustration of the prior art.

In one embodiment of the invention, upon transmitting (either by copying or moving) files to a different location, the transfer protocol could provide (in addition to the timestamp attributes of the files) information that enables a comparison to be made between the time according to the transmitting and receiving servers. In other words, if the servers are out of sync or in a different time zone, the difference in date and time is detected and the timestamps of the files being transferred can be modified to account for the recognized discrepancy.

In this way, the timestamp is preserved, as well as the relative differences between files received from different locations. The timestamps attributed to a file can therefore be deemed accurate relative to all files stored on the server on which it resides. So if after transmission a file's timestamp indicates it was modified at 12:30 P.M. on Jan. 1, 2008 and the present time on that server is 1:30 P.M. on Jan. 1, 2008, then it was actually modified 60 minutes ago, regardless of where it came from. The "relative timestamp" can therefore always be accurate relative to the date and time on the server on which the files resides.

Figure 2:
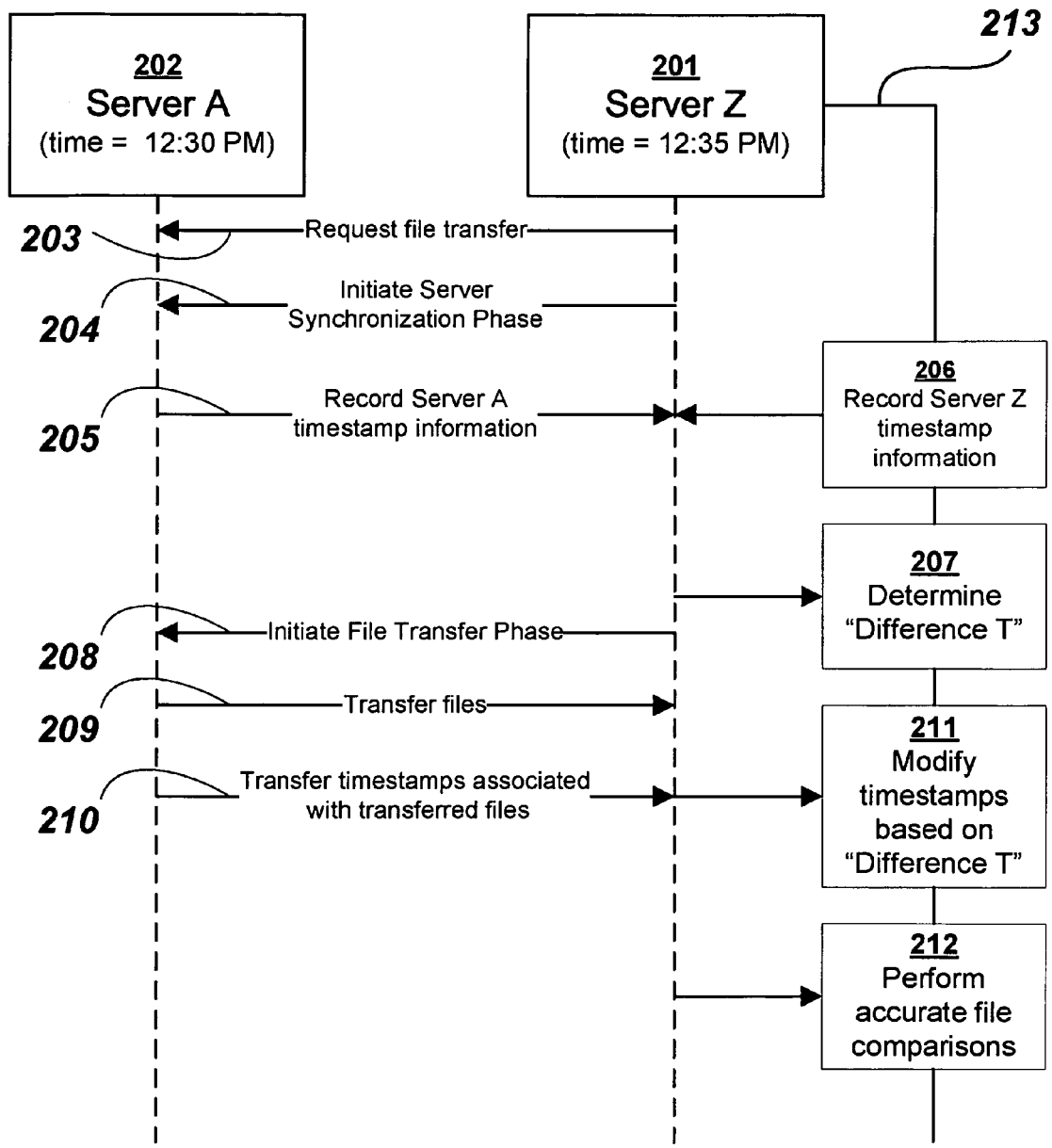
FIG. 2 illustrates the added functionality implemented by an embodiment of the invention.

FIG. 2 illustrates the added functionality implemented by such an embodiment. The receiving server 201, known as Server Z, can request a file transfer (i.e., transmission) at step 203 from server 202, known as Server A. It is further illustrated that in the embodiment, certain processes may take place in Server Z and appear on line 213.

Server Z can initiate a "Server Synchronization Phase" at step 204. It is recognized that an instantaneous and perfect synchronization may not be possible (e.g., to the exact same microsecond) but even an imperfect effort would generally satisfy the requirements of the embodiment. Thus, at nearly the same time, Server A records timestamp information (i.e., the current date and time) at step 205 while Server Z records timestamp information at step 206. Server Z can then determine the date and time difference between the two timestamps ("Difference T") at step 207. Server Z can then initiate the "File Transfer Phase" at step 208 whereby Server A transfers files to Server Z at step 209. Server A may also transfer (without changing them to denote only the date and time of transfer) some or all of the associated timestamp information (date modified, date created, etc.) associated with the transferred files at step 210. Server A can then use Difference T to modify the received timestamps at step 211 so that they reflect date and time information that is accurate relative to the current date and time according to Server Z. Server Z can then perform accurate comparisons based on the received timestamps (and their associated files) at step 212.

It is recognized that the described embodiment can be performed in other similar manners in addition to the particular process illustrated in FIG. 2. For example, the Server Synchronization Phase can take place after the files and their attributes are transferred (i.e., after the File Transfer Phase). In addition, it is recognized that each file attribute can be transmitted together with (or before or after) the file it is associated with is transmitted.

Alternatively, a third server (i.e., computer) may provide current date and time information for synchronization purposes. In yet another alternative, Server A (instead of Server Z) can determine "Difference T" and modify the timestamps for the transferred files before they are transmitted to Server A. Other implementations of the embodiment may be apparent to those with skill in the art. All such embodiments may be within the scope of the invention.

With the described approach (such as illustrated in FIG. 2), a directory of files with timestamps can always be accurate with respect to the server on which the files reside. Furthermore, in addition to implementing the embodiment for comparisons (and other uses) on a single server where all the files reside, the embodiment of the invention can be implemented to achieve accurate comparisons of file timestamps between different servers, even if they maintain a different time, as long as the servers first determine their time difference.

Figure 3:
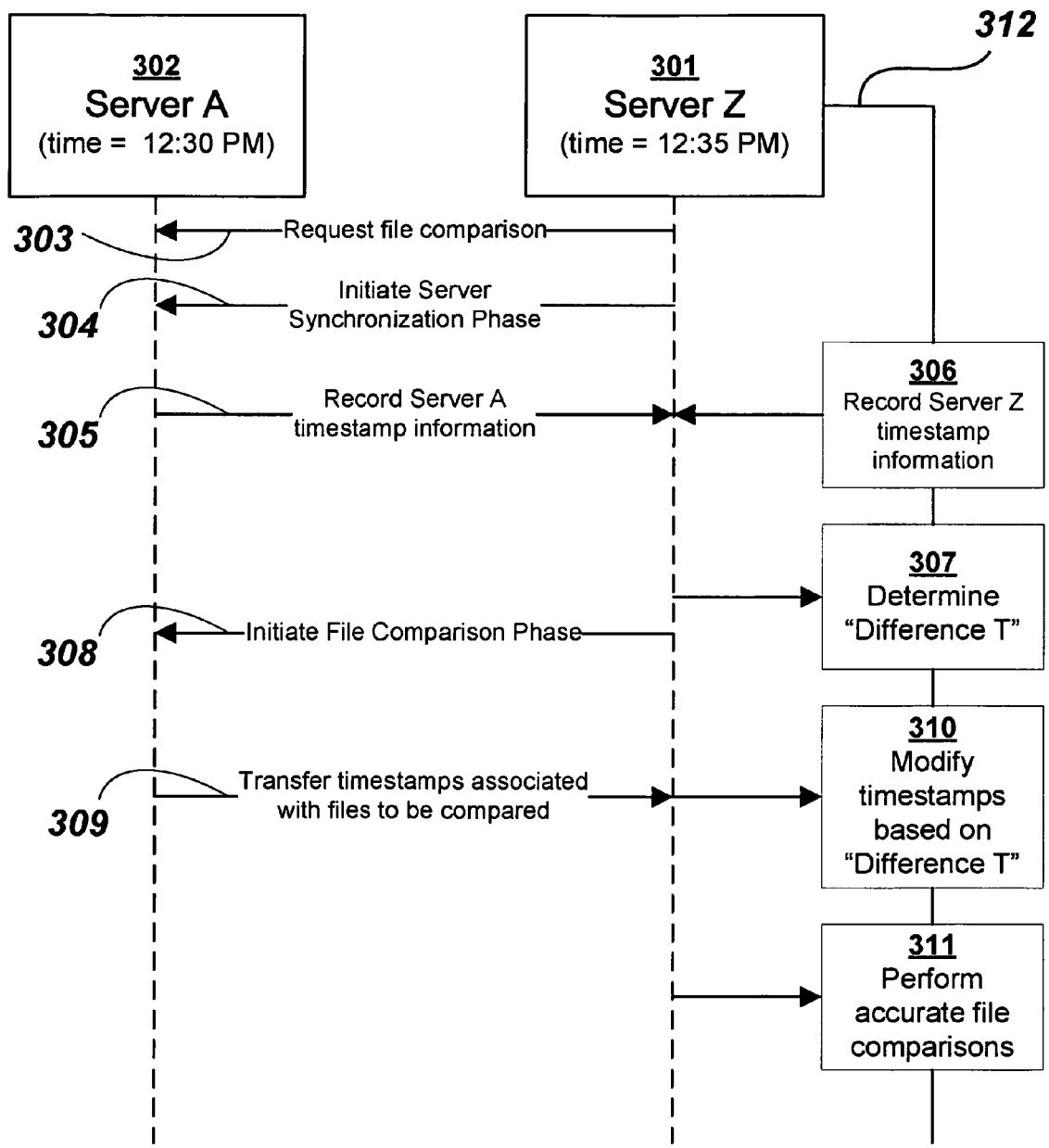
FIG. 3 illustrates the added functionality implemented by another embodiment of the invention.

FIG. 3 illustrates the added functionality implemented by such an embodiment for comparison (as opposed to file transfer) purposes. The comparing server 301, known as Server Z, can request a file comparison at step 303 from server 302, known as Server A. It is further illustrated that in the embodiment, certain processes may take place in Server Z and appear on line 312. Server Z can initiate a "Server Synchronization Phase" at step 304. At nearly the same time, Server A records timestamp information (i.e., the current date and time) at step 305 while Server Z records timestamp information at step 306. Server Z can determine the difference between the two timestamps ("Difference T") at step 307. Server Z can then initiate the "File Comparison Phase" at step 308 whereby Server A transfers timestamp information associated with the files at step 309. Server A can then use Difference T to modify the received timestamps at step 310 so they accurately reflect date and time information that is accurate relative to the current date and time according to Server Z. Server Z can then perform accurate comparisons based on the received timestamps (and their associated files) at step 311. As noted with respect to FIG. 2, many alternative implementations of the embodiment in FIG. 3 can be envisioned and may be within the scope of the invention.

These and other embodiments could be incorporated into existing standards (e.g., ftp or network-mount technology such as Samba), or included as a feature of custom file transfer applications.

In the described embodiments, Difference T can be designed to account for any differences in time, date or time zone. This can be achieved with a Server Synchronization Phase that compares date and time wherein the date and time on both servers can be provided in Coordinated Universal Time ("UTC") or Greenwich Mean Time ("GMT"). Alternatively, the date and time on both servers can be provided together with their respective time zones.

Figure 4:
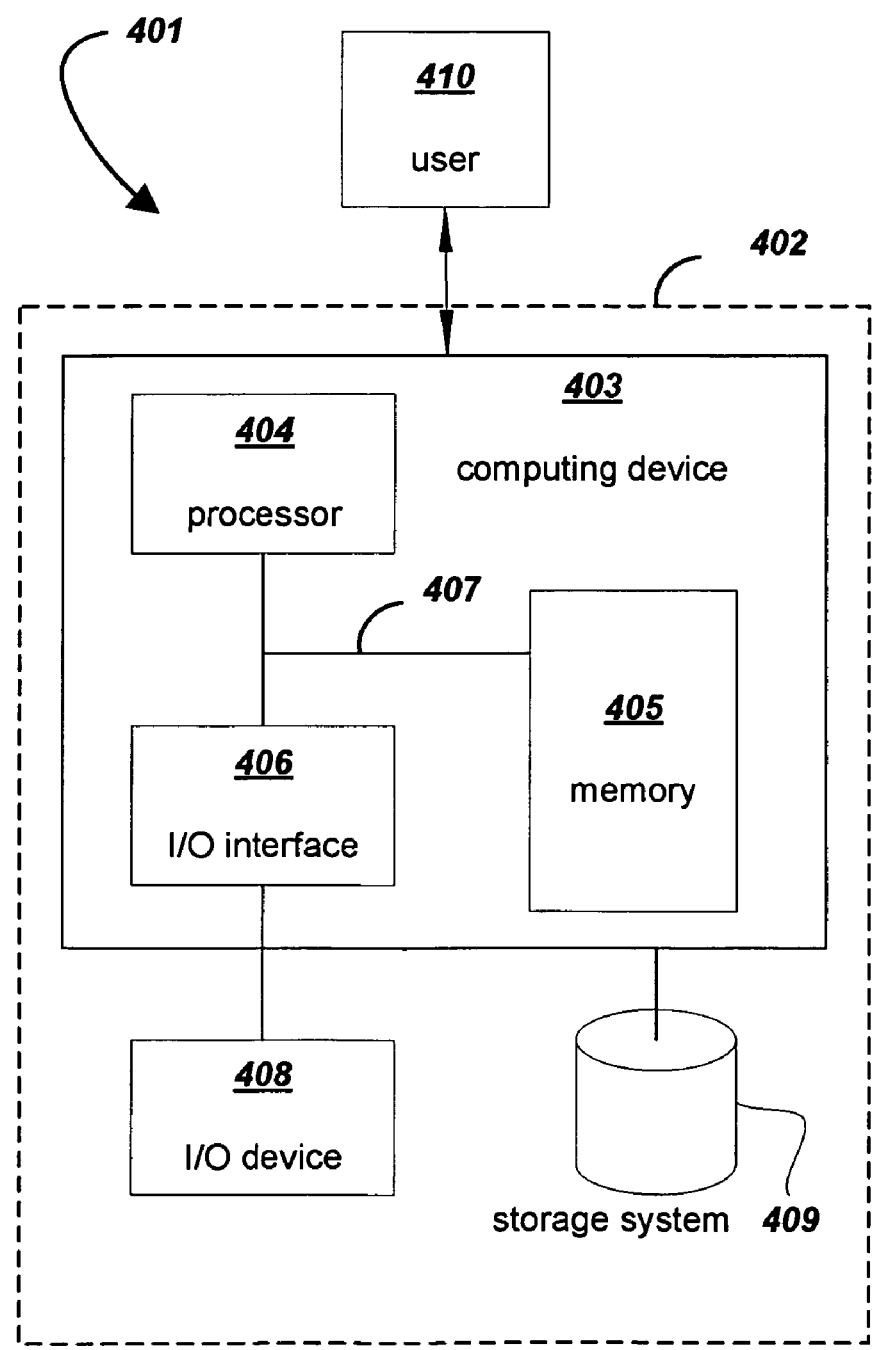
FIG. 4 shows an illustrative computer environment for managing the processes in accordance with an embodiment of the invention.

FIG. 4 shows an illustrative environment 401 for managing the processes in accordance with the embodiment of the invention. To this extent, the environment 401 includes a computer infrastructure 402 that can perform the processes described herein. In particular, the computer infrastructure 402 is shown including a computing device 403 operable to perform the processes described herein. The computing device 403 is shown including a processor 404, a memory 405, an input/output (I/O) interface 406 and a bus 407. Further, the computing device 403 is shown in communication with an external I/O device/resource 408 and a storage system 409. As is known in the art, in general, the processor 404 executes computer program code, which is stored in memory 405 and/or storage system 409. While executing computer program code, the processor 404 can read and/or write data to/from memory 405, storage system 409, and/or I/O interface 406. The bus 407 provides a communications link between each of the components in the computing device 403. The I/O device 408 can comprise any device that enables an individual to interact with the computing device 403 or any device that enables the computing device 403 to communicate with one or more other computing devices using any type of communications link.

The computing device 403 can comprise any general purpose computing article of manufacture capable of executing computer program code installed thereon (e.g., a personal computer, server, handheld device, etc.). Computing device 403 can therefore represent any of the servers described in the embodiment. It is also understood that the computing device 403 is only representative of various possible equivalent computing devices that may perform the processes described herein. Similarly, the computer infrastructure 402 is only illustrative of various types of computer infrastructures for implementing the invention. For example, in one embodiment, the computer infrastructure 402 comprises two or more computing devices (e.g., a server cluster) that communicate over any type of communications link, such as a network, a shared memory, or the like, to perform the process described herein. The system and method in the described embodiment can be executed by computing device 403 wherein the transferred files with their associated timestamps (or just comparison information and associated timestamps) are stored in memory 405 and/or the storage system 409 and processed by the processor 404. In particular, the processes on lines 213, 312, and 521 (in FIG. 5, described below) may be executed by computing device 403 using in memory 405 and/or the storage system 409 and processed by the processor 404. Computing device 403 can connect to other computing devices (such as other servers) on a network via I/O interface 406 which is connected to the I/O device 408. A user 410 can use the server via the I/O device 408 (which is connected to I/O interface 406) to practice the embodiment of the invention.

The embodiment can be further implemented with respect to multiple servers by means of the same Server Synchronization Phase. Three servers can employ a single synchronization phase, or can instead employ multiple synchronization phases wherein multiple Difference T values can be used to maintain accurate timestamp information relative to a single server.

Figure 5:
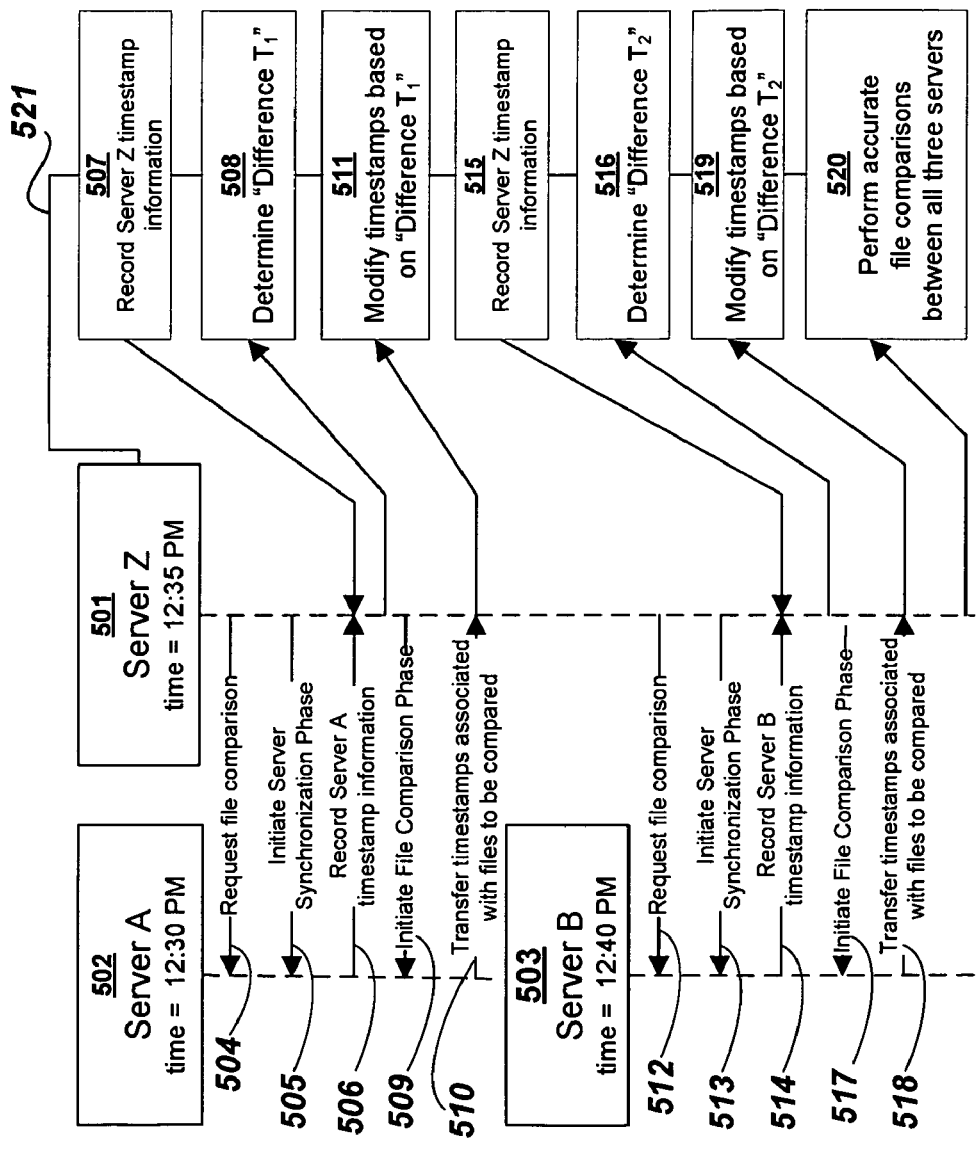
FIG. 5 illustrates the added functionality implemented by yet another embodiment of the invention.

For example, FIG. 5 illustrates an embodiment where multiple synchronization phases may be used for a file comparison. The receiving server 501, known as Server Z, can request a file transfer (i.e., transmission) at step 504 from server 502, known as Server A. It is further illustrated that in the embodiment, certain processes may take place in Server Z and appear on line 521.

The comparing server 501, known as Server Z, can request a file comparison at step 504 from server 502, known as Server A, and may additionally request a file comparison at step 512 from server 503, known as Server B. It is further illustrated that in the embodiment, certain processes may take place in Server Z and appear on line 521.

Server Z can initiate a "Server Synchronization Phase" at step 505. At nearly the same time, Server A records timestamp information (i.e., the current date and time) at step 506 while Server Z records timestamp information at step 507. Server Z can determine the difference between the two timestamps ("Difference $T_1$") at step 508. Server Z can then initiate the "File Comparison Phase" at step 509 whereby Server A transfers timestamp information associated with the files at step 510. Server A can modify the received timestamps using Difference $T_1$ at step 511 so they are accurate relative to the current date and time according to Server Z.

Server Z may request a file comparison at step 512 from server B at the same time it requests a file comparison from Server A at step 504 or alternatively, at a different time. Upon initiating a "Server Synchronization Phase" with Server B at step 513, Server A records timestamp information (i.e., the current date and time) at step 514 while Server Z records timestamp information at step 515 at nearly the same time. Server Z can determine the difference between the two timestamps ("Difference $T_2$") at step 516. Server Z can then initiate the "File Comparison Phase" at step 517 whereby Server A transfers timestamp information associated with the files at step 518. Server A can modify the received timestamps using Difference $T_2$ at step 519 so they are accurate relative to other files to be compared by Server Z.

Finally, Server Z can perform accurate comparisons between files on all three servers (A, B and C) based on received timestamps in step 520. As noted with respect to FIGS. 2 and 3, many alternative implementations of this embodiment can be envisioned and are within the scope of the invention. It is recognized that in light of the above disclosure, additional embodiments of the invention can be envisioned and implemented in a wide variety of file transfer and comparison scenarios.

What is claimed is:

1. A method for maintaining relative file timestamps comprising:
    determining if there is a difference between a current date and time according to a transmitting server and a current date and time according to a receiving server;
    transmitting a file from the transmitting server to the receiving server;
    transmitting a timestamp attribute associated with the file from the transmitting server to the receiving server; and
    modifying the timestamp attribute to account for the difference in date and time between the transmitting server and the receiving server so that the timestamp attribute is accurate relative to the current date and time according to the receiving server.

* * * * *